April 10, 1951 G. P. HAFER ET AL 2,548,669
PROFILING APPARATUS
Filed July 14, 1945 4 Sheets-Sheet 2

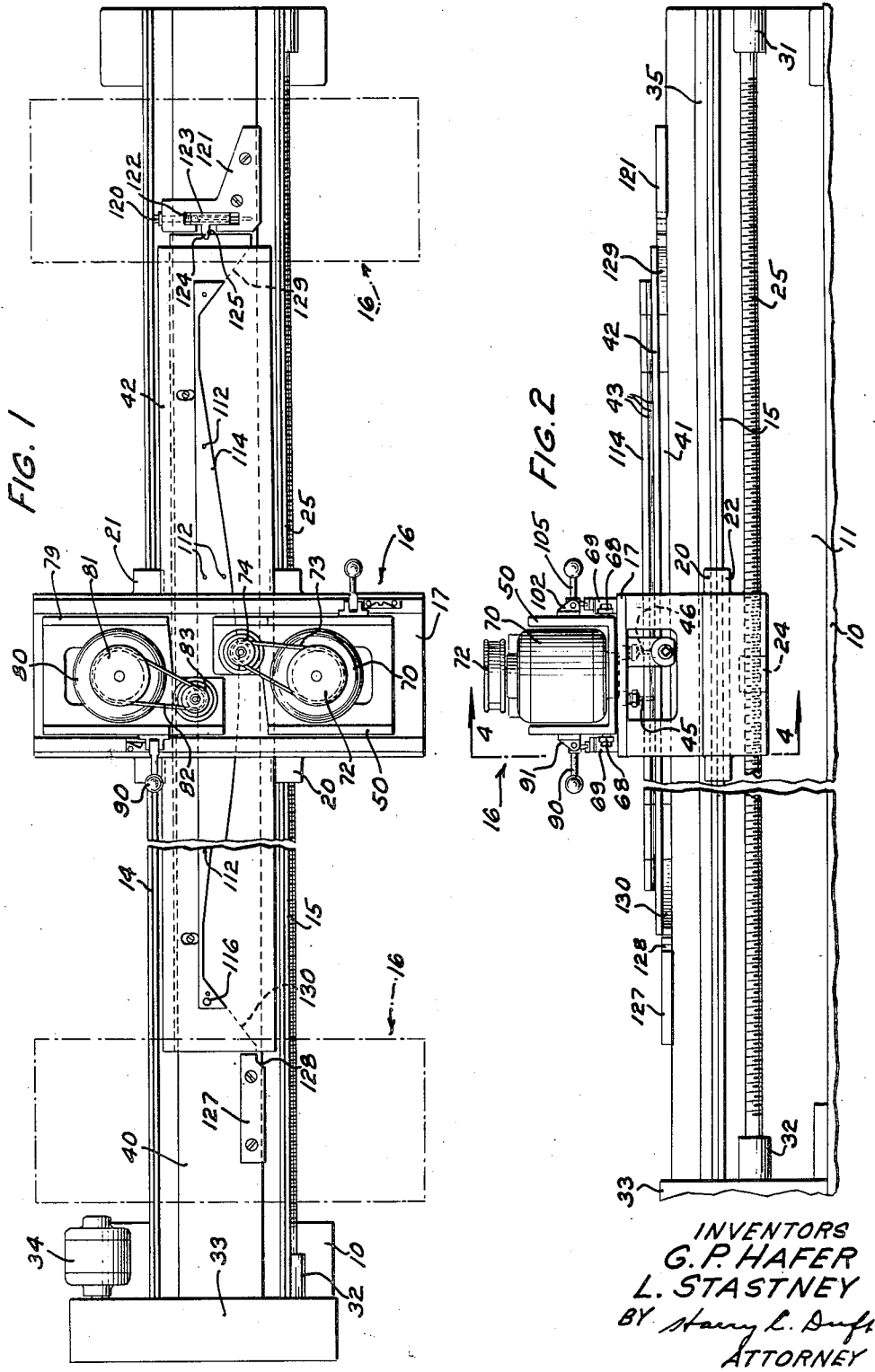

INVENTORS
G. P. HAFER
L. STASTNEY
BY Harry L. Duft
ATTORNEY

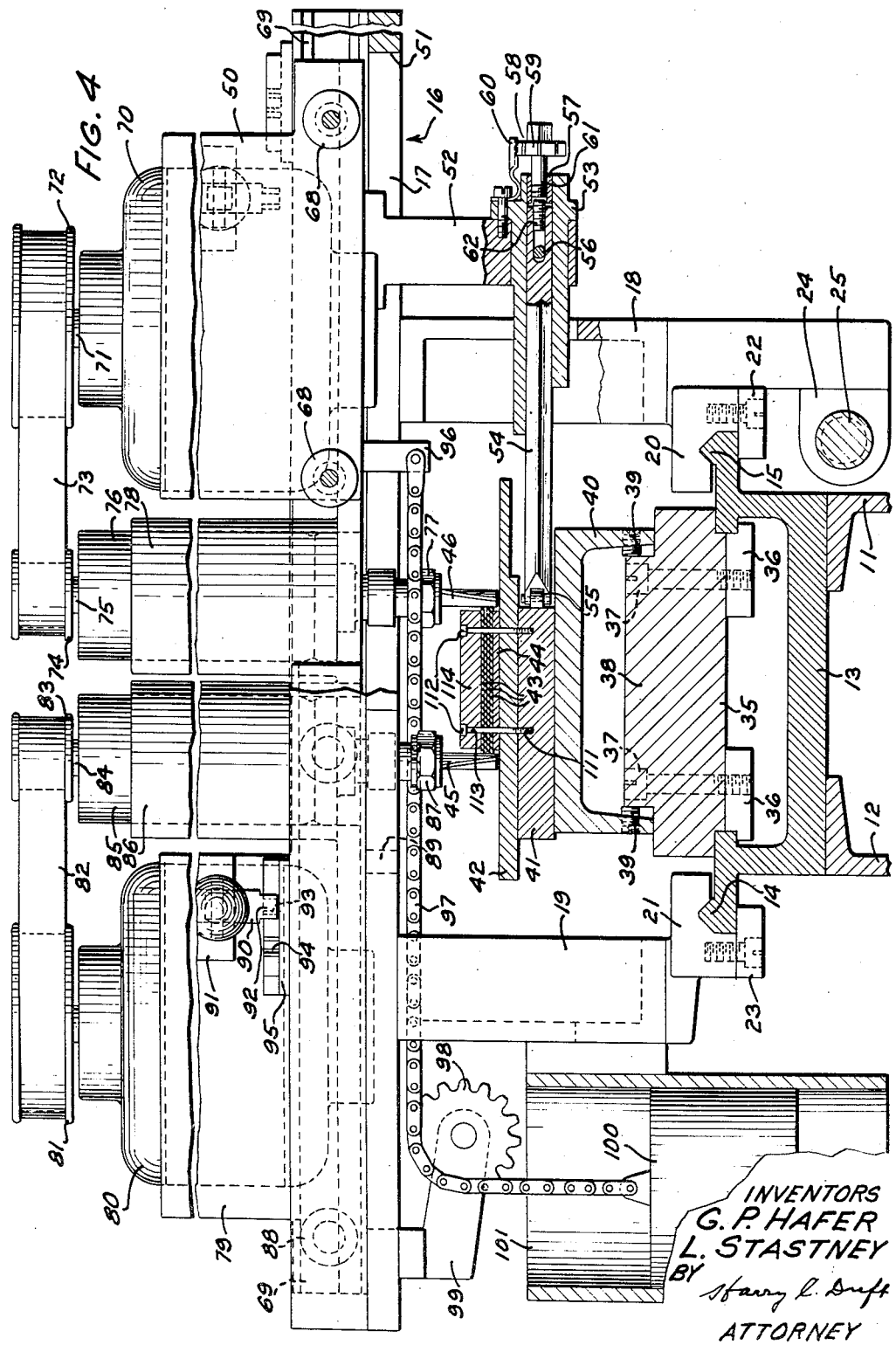

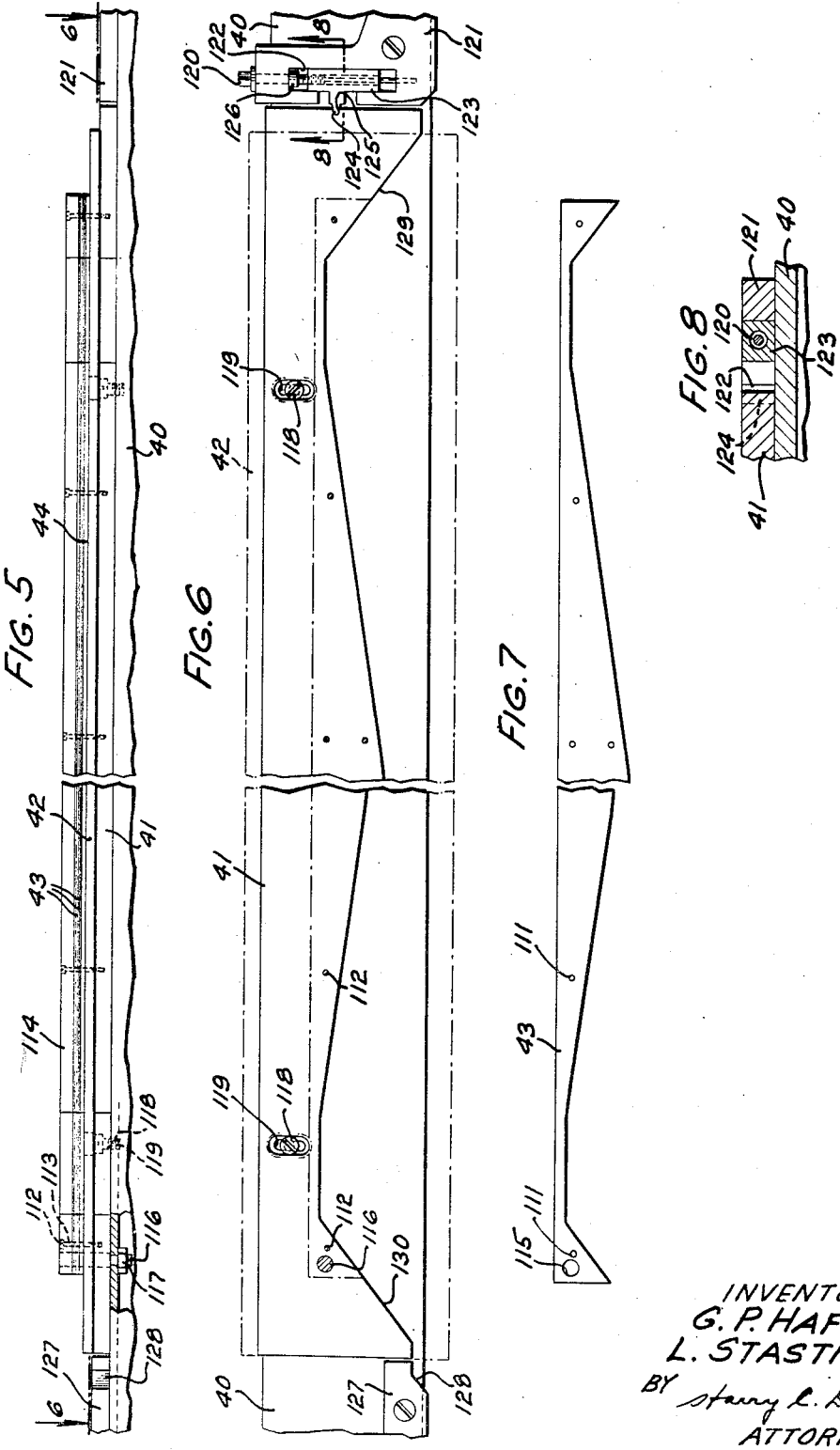

Patented Apr. 10, 1951

2,548,669

UNITED STATES PATENT OFFICE 2,548,669

PROFILING APPARATUS

Giles P. Hafer, Downers Grove, and Louis Stastney, Cicero, Ill., assignors to Western Electric Company, Incorporated, New York, N. Y., a corporation of New York Application July 14, 1945, Serial No. 605,132

5 Claims. (Cl. 90—13)

This invention relates to a profiling apparatus and more particularly to an apparatus for cutting potentiometer cards to a predetermined contour.

In the manufacture of some potentiometers, insulator cards are utilized which are of irregular configuration to accommodate the various lengths of resistance wire wound thereon within a given space on the cards. In order to maintain a high degree of accuracy in the instruments, it is essential that the cards be cut to exact dimensions.

It is an object of the present invention to provide a simple and efficient apparatus for rapidly profiling articles.

In accordance with one embodiment of the invention, a lathe type apparatus is provided wherein the travelling carriage supports a pair of motors, one of which may be fixed to maintain a definite relation to the ways of the lathe during the travel of the carriage, thus to move a side mill in a straight line during the milling of one edge of the card. A table for supporting the cards to be cut is fixed with respect to the bed of the lathe, as is a cam having the same contour as the irregular edge to be formed on the card. The other motor on the carriage is normally urged to carry a cam roller into engagement with the cam, whereby a side mill, driven by the last-mentioned motor, will travel through an irregular path as controlled by the shape of the cam. Means are provided for micrometrically adjusting the position of the cam to properly align it with the path of travel of the carriage and means are provided at the end of the travel of the carriage for moving the movable motor to an extreme position, where it is automatically latched after completing the operation of milling the cards.

A complete understanding of the invention may be had by reference to the following detailed description when considered in conjunction with the accompanying drawings, wherein Fig. 1 is a plan view of an apparatus embodying the invention, part being broken away to conserve space;

Fig. 2 is a front elevational view of the apparatus shown in Fig. 1;

Fig. 4 is a transverse vertical sectional view through the apparatus taken along the line 4—4 of Fig. 2 in the direction of the arrows;

Fig. 5 is a detail view on an enlarged scale showing the main cam and a pileup of cards clamped in place to be milled, parts being broken away to conserve space;

Fig. 6 is a detailed view taken substantially along the line 6—6 of Fig. 5 in the direction of the arrows;

Fig. 7 is a detail view showing the contour of a card to be formed in the apparatus; and Fig. 8 is a fragmentary sectional view taken substantially along the line 8—8 of Fig. 6 showing details of construction of the mechanism for adjusting the position of the cam.

Figure 3:
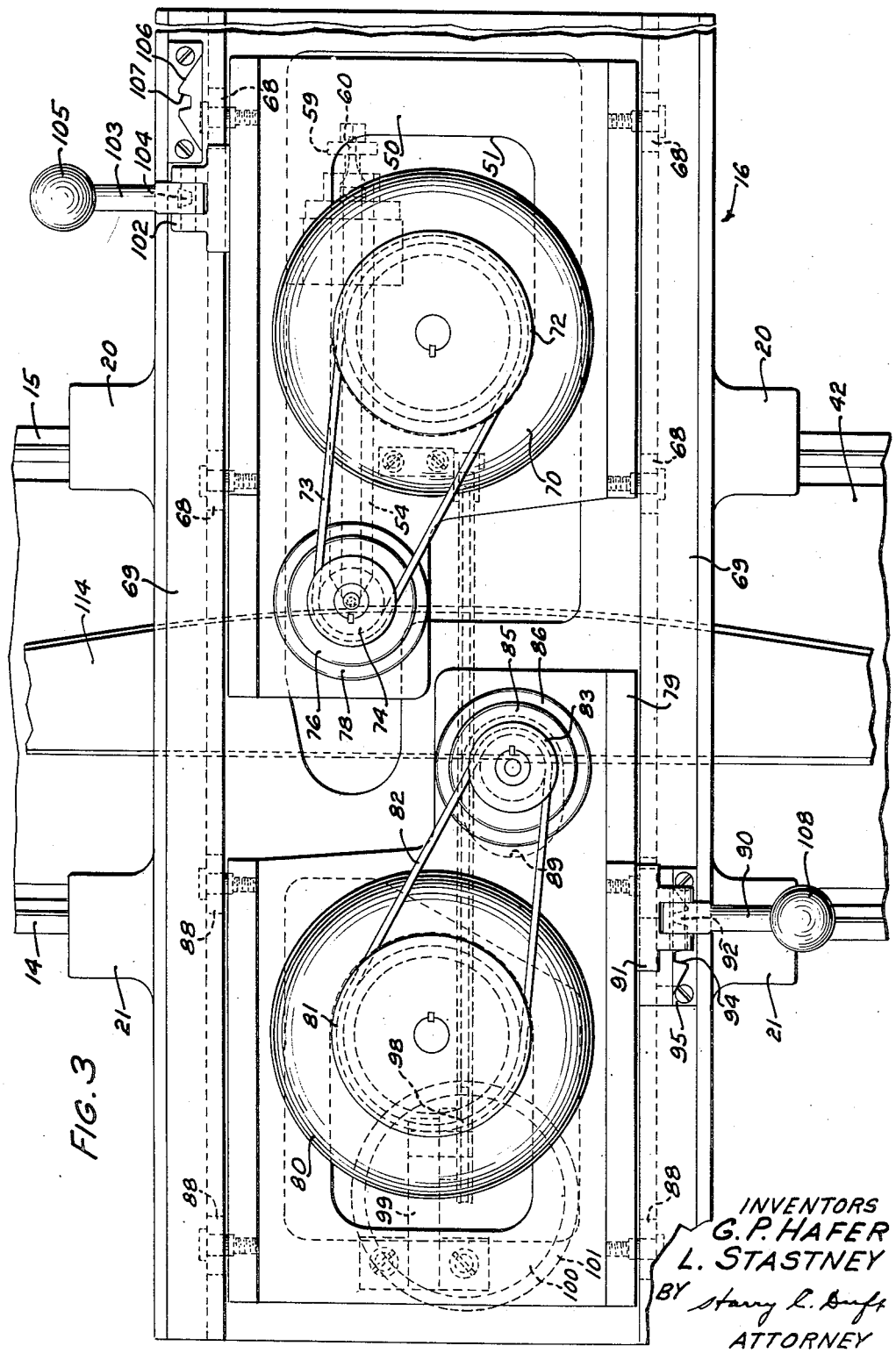
Fig. 3 is a plan view of the carriage on an enlarged scale.

In the drawings, a profiling apparatus is illustrated which comprises a lathe bed 10 having fixed thereto a pair of table supporting channel members 11 and 12 (Figs. 2 and 4), on which there is mounted a rail bracket 13, which carries rails 14 and 15 constituting the ways on which a carriage assembly 16 is movable. The carriage assembly 16 comprises a main bed plate 17 having extending downwardly therefrom a pair of support frames 18 and 19, to which are fixed a pair of guide members 20 and 21 for slidably engaging the rails 15 and 14, respectively, keeper plates 22 and 23 serving to hold the guide members on the rails. The support frame 18 extends downwardly below the rail 15 and has a travelling nut 24 fixed thereto for threadedly engaging a feed screw 25. The feed screw 25 is journalled in bearings 31 and 32 (Fig. 2) suitably attached to the channel member 11 and is connected through a gear box 33 to a driving motor 34, suitably positioned on the bed 10.

In addition to supporting the rails 14 and 15, the rail bracket 13 (Fig. 4) supports a bed block 35, which extends throughout the length of the rail bracket and is clamped to the bracket by clamping lugs 36—36 threaded to receive clamping screws 37—37. The bed block 35 has a central raised portion 38 extending throughout its length for engagement by set screws 39—39 threaded into the flanges of an inverted channel member 40. The channel member 40 serves to support a cam 41 having superposed thereon a card supporting table 42, on which a plurality of cards 43 are to be carried. In order to space the cards 43 slightly above the upper surface of the table 42, a spacer member 44 is interposed between the bottom card and the table 42 and this spacer member corresponds in contour to, but is of slightly less width than the cards 43 to be formed by side mills 45 and 46. The table 42 extends out an appreciable distance over the edge of the cam 41 to prevent material cut from the cards 43 by the side mills 45 and 46 from becoming deposited on the face of the cam 41.

The main bed plate 17 of the carriage assembly 16 has an aperture 51 formed in it through which extends a bracket 52 fixed to a cross slide 50. Mounted in the bracket 52 is a bearing 53 for slidably supporting a cam bar 54 carrying a cam roller 55 in engagement with the cam 41. The cam bar 54 is adjustably slidable with respect to the bearing 53 and has a pin 56 extending through it and through the bearing to prevent rotation of the bar 54. Seated in the bearing 53 is an internally threaded sleeve 57, adapted to threadedly receive an adjusting screw 58, which is provided with a notched head 59 positioned to be engaged by a spring 60, which is fixed to the bearing 53. The adjustment screw 58 has a large threaded portion 61 and a small threaded portion 62. The small threaded portion has a predetermined number of threads per inch, for example, twenty-eight threads to the inch, and is threaded into the cam bar 54, whereas the large portion 61 has slightly fewer threads per inch, for example, twenty-four threads per inch, and is threaded into the sleeve 57, whereby a relatively large amount of rotation of the screw 58 will result in a very small amount of movement being imparted to the cam bar 54. By the provision of this mechanism, the cam bar 54 may be adjusted with respect to the cross slide 50 with a high degree of precision.

The cross slide 50 (Fig. 2) is of substantially U-shaped cross section and carries a plurality of rollers 68—68, which ride in rails 69—69 (Figs. 3 and 4) fixed to the main bed plate 17 of the carriage assembly 16. Mounted on the cross slide 50 is a motor 70 having a shaft 71 carrying a pulley 72. The pulley 72 is engaged by a belt 73, which extends into driving engagement with a driven pulley 74. The pulley 74 is mounted upon a shaft 75 journalled in a bearing 76 and carries at its lower end a chuck 77, in which the side mill 46 is mounted. Secured to the base of the cross slide 50 is a bearing housing 78 for rigidly supporting the bearing 76 on the cross slide.

Slidable along the rails 69 is a second cross slide 79 of substantially the same construction as the cross slide 50. The cross slide 79 supports a motor 80 for driving a pulley 81, which, in turn, engages and drives a belt 82 engaged with a driven pulley 83. The pulley 83 is mounted upon a shaft 84 mounted in a bearing 85 carried by a bearing housing 86. Fixed to the lower end of the shaft 84 and rotatable therewith is a chuck 87 for supporting the side mill 45. The cross slide 79 is provided with rollers 88, similar to the rollers 68 on cross slide 50 and the cross slide 79 is mounted for a limited amount of movement along the rails 69—69. The cross slide 79 serves to support the side mill 45 in either of two adjusted positions, the shaft 84 extending through an aperture 89 in the main bed plate 17 of the carriage 16. Mechanism is provided for locking the cross slide 79 in either of its two adjusted positions and this mechanism comprises a pivoted latch 90 pivotally mounted in a bracket 91 fixed to the cross slide 79. The pivoted latch 90 is provided with a latching portion 92 adapted to enter either a slot 93 or a slot 94 in a latch plate 95 fixed to one of the rails 69. Thus the shaft 84, carrying the chuck 87 and side mill 45, may be positioned with the cross slide 79 in either of two positions, that is, either in position to cut cards 43 or in an inoperative position with respect to the cards 43.

Extending downwardly from the cross slide 50 is a bracket 96, to which one end of a link chain 97 is suitably attached. The link chain 97 passes over an idler sprocket 98 mounted on a bracket 99 fixed to the main bed plate 17. Attached to the other end of the link chain 97 is a weight 100 slidable in suitable housing 101 mounted on the supporting frame 19. The weight 100 normally tends to move the cross slide 50 to the left, as viewed in Figs. 3 and 4, to carry the cam roller 55 rigidly fixed to the cross slide 50 into engagement with the cam 41.

Mounted on the cross slide 50 is a latch supporting bracket 102 having freely pivoted therein a latch member 103 provided with a latching portion 104 normally urged to the position shown in the various figures by a weighted handle 105. The latching portion 104 is tapered slightly and when the cross slide 50 is moved to an extreme position from that shown in the drawings, the latching portion 104 will ride up the sloping side of a latch bracket 106 and will enter a latching notch 107, thus to lock or latch the carriage in an extreme right hand position, as viewed in Figs. 3 and 4. The bracket 106 is suitably fixed to one of the rails 69 and thus, when the cross slide 50 is moved to its extreme right hand position (Fig. 4), the cross slide will be latched in that position until manually released. While the pivoted latch 90 is also provided with a weighted handle 108 (Fig. 3), the cross slide 79 is not mechanically shifted from one position to another, but may be manually set in either of its adjusted positions.

From the foregoing, it is believed to be apparent that the cross slide 79 may be locked in its inoperative or operative position and that unless the cross slide 50 is moved to its extreme right hand position, as viewed in Figs. 3 and 4, the position of the slide 50 will be controlled by the cam 41 and thus the position of the side mills 45 and 46 will control the cutting of the cards 43 on the card supporting table 42. The cards 43, in a previous operation, are cut to approximate size, leaving only a small portion of the material of the cards to be milled off in the apparatus of the present invention to form cards 43 of the contour illustrated most clearly in Fig. 7. These cards are provided with a plurality of apertures 111—111 spaced over their surface, through which machine screws 112—112 may be passed to clamp a stack of the cards on the table 42. These machine screws are threaded into the table 42, extend through the cards, and are set into shouldered apertures 113 in a clamping plate 114 of the same contour as the table 42. Each of the cards has one relatively large aperture 115 formed adjacent its left end, as viewed in Fig. 7, through which a shouldered pivot stud 116 may pass. This pivot bolt also extends through the clamping plate 114, the table 42, the cam 41, and the web of the inverted channel 40, being held in place by a nut 117. In addition to being held in position on the channel 40 by the shouldered pivot stud 116, the cam 41 is tied down to the channel 40 by a plurality of machine screws 118, which are threaded into the flange of the channel and extend into slots 119 in the cam 41, the size of which is exaggerated slightly in Fig. 6. The mounting of the cam 41 on the inverted channel 40 in this manner will permit a slight adjustment of the cam with respect to the channel member, which may be effected by an adjustment screw 120. A plate 121, fixed to the inverted channel member 40, has a T-shaped slot 122 formed in it, in which an adjustment bar 123 is slidably positioned. The bar 123 carries a pointed projection 124 in a notch 125 in the cam 41. The adjustment screw 120 is freely rotatable in the plate 121, but is restrained against longitudinal movement with respect thereto by its head and a collar 126 fixed to the screw. In addition, the screw 120 is threaded into the adjustment bar 123 so that minute adjustments of the position of the cam 41 may be effected by manipulating the screw 120 to rock the cam about the pivot bolt 116.

As will be noted by reference to Figs. 1 and 6, there is a cam 127 mounted on the channel member 40 with a portion thereof forming a continuation with the left end of the cam 41, which portion terminates in a sloping surface 128. The purpose of this cam will become apparent by reference to the following description of the mode of operation of the apparatus. In setting the apparatus for operation, a single card may be placed on the table 42 and clamped in place by the clamping plate 114 and, after the card has been placed in position, the carriage assembly 16 being in its extreme right hand position with the cross slides locked in their inoperative position by means of the latch member 103 and pivoted latch 90, the motor 34 may be started to feed the carriage assembly 16 into a position where the cam roller 55 will engage the right hand sloping surface 129, as shown in Fig. 6, of the cam 41, whereupon the motors 70 and 80 may be started. With the motors 70 and 80 running, the cross slide 79 may be moved to its operative position and latched therein by means of the pivoted latch 90. The latch member 103 may then be disengaged from the latching bracket 106 and as the motor 34 drives the screw 25, the travelling carriage assembly 16 will move along the rails 14 and 15. In its travel along the rails 14 and 15, the carriage 16 will carry the side mill 45 in a straight path and the side mill 46 will move in a path as determined by the contour of the cam 41. The milling tools will thus engage and cut the card 43, which has been clamped on the table 42 by the clamping plate 114, and after the card has been cut, the cam roller 55 will travel up the lefthand sloping surface 130 (Fig. 6) of the cam 41 and onto the cam 127. When the roller 55 rides up the surface 128, the latching portion 104 of latch member 103 will ride up the sloping surface of the latching bracket 106 and will enter the notch 107, suitable means (not shown) being provided for stopping the motor 34 when the carriage assembly 16 reaches its extreme lefthand position. In this manner, a card will be cut to substantially the desired contour and the card may then be gaged to determine whether it is within the desired limits. In view of the fact that the width of the various portions of the card must be held within exceedingly close limits, for example, somewhere in the neighborhood of .001", it will be necessary to gage the card and determine whether it is within those limits. Any slight variation from the desired dimensions may be compensated for by manipulating the screw 120 to adjust the position of the cam 41 about the pivot stud 116. After this adjustment has been made, the apparatus is in condition to operate on a plurality of cards at a time and a stack of cards cut to approximately the proper contour may be placed between the spacer member 44 and clamping plate 114 and then placed on the table 42. Since the table 42 is fixed to the cam 41, cards held on the table 42 will have a definite relation to the cam 41 and a plurality of cards may be milled in the apparatus by following the same procedure which was followed in making the test sample prior to the adjustment of the position of the cam 41 by means of the adjusting screw 120. It will be noted that the carriage assembly 116 may be returned to its right hand position after a group of cards have been profiled on the apparatus while a new group of cards is being assembled with the clamping plate 114 and spacer member 144 so that, after the new group of cards is assembled between the spacer and clamping plate, the carriage assembly 16 will be in position to start a new profiling operation.

What is claimed is:

1. In a profiling machine, an article supporting table pivoted at one end, a carriage movable longitudinally of said table, cross slides mounted on said carriage for movement transversely of said table, a cutter on each of said cross slides, means for clamping articles on said table, a control cam extending along said table for controlling the position of one of said cutters with respect to an article on the table, a base for supporting the control cam and table in superposed relation, means for aligning the cam and table with the path of movement of the carriage by rotating the table about its pivot including a power multiplying means movable with respect to the base, and means interconnecting the power multiplying means with the table to obtain said alignment.

2. In a profiling machine, an article supporting table, a carriage movable longitudinally of said table, a cross slide mounted on said carriage for movement transversely of said table, a cutter on said cross slide, means for clamping articles on said table, a control cam extending along said table for controlling the position of said cutter with respect to an article on the table, a base for supporting the control cam and table in superposed relation, a pivot on said base and extending through the cam and table, and means for aligning the cam and table with the path of movement of the carriage comprising an adjustment screw rotatable with respect to the base, and means interconnecting the adjustment screw with the cam whereby rotation of the adjustment screw will move the cam and table about the pivot.

3. In a profiling machine, a horizontally disposed article supporting table, a clamp for clamping articles in superposed relation on said table, guideways extending longitudinally with respect to said table, a carriage mounted on said guideways in spaced relation to and above the table, a cross slide mounted on said carriage and movable in a path transverse with respect to said table, a side mill carried by said cross slide in position to mill the side edges of articles supported by the table, a control cam for controlling the position of the cross slide, and means positioned adjacent said control cam and at the end of travel of the carriage for forcing the cross slide away from the articles to automatically latch said cross slide upon completion of a milling operation.

4. In a profiling machine, a horizontally disposed article supporting table, means for clamping articles in superposed relation on said table, guideways extending longitudinally with respect to said table, a carriage mounted on said guideways in spaced relation to and above the table, a cross slide mounted on said carriage and movable in a path transverse with respect to said table, a side mill carried by said cross slide in position to mill the side edges of articles supported by the table, means for urging said cross slide to carry its cutter toward the articles on the table, a cam follower attached to said cross slide and also controlled by the said urging means, a control cam against which the cam follower is urged to control the position of said side mill with respect to the articles on the table, means at the end of said cam for engaging said follower and moving said cross slide to an inoperative position upon completion of a cut, and means cooperating between said cross slide and carriage operable in said inoperative position for locking said cross slide against movement with respect to said carriage.

5. In a profiling machine, a table, means for clamping a plurality of articles in superposed relation on said table, a carriage movable in a straight line longitudinally of said table, a cross slide mounted on said carriage, a side mill carried by said cross slide for milling the edges of superposed articles on the table, means for urging the side mill toward the articles, a cam follower attached to said cross slide, a cam against which the cam follower is urged to control the position of the side mill with respect to the articles, a locking means for said cross slide, and means positioned adjacent the said cam for contacting the cam follower for actuating said locking means to lock the said cross slide in an inoperative position after the articles have been cut to a predetermined contour as controlled by the cam.

GILES P. HAFER.
LOUIS STASTNEY.

REFERENCES CITED

The following references are of record in the file of this patent:

UNITED STATES PATENTS

| Number | Name | Date |
|---|---|---|
| 803,137 | Salmon | Oct. 31, 1905 |
| 2,314,541 | Hyland | Mar. 23, 1943 |
| 2,317,616 | Jones | Apr. 27, 1943 |
| 2,341,194 | Schwartz | Feb. 8, 1944 |
| 2,345,494 | Onsrud | Mar. 28, 1944 |
| 2,361,820 | Cromwell | Oct. 31, 1944 |

FOREIGN PATENTS

| Number | Country | Date |
|---|---|---|
| 681,494 | Germany | Sept. 23, 1939 |